(12) United States Patent
Tomioka

(10) Patent No.: US 7,515,335 B2
(45) Date of Patent: Apr. 7, 2009

(54) ENDOSCOPE RELAY LENS

(75) Inventor: Makoto Tomioka, Hamburg (DE)

(73) Assignee: Olympus Winter & IBE GmbH, Hamburg (DE)

( * ) Notice: Subject to any disclaimer, the term of this patent is extended or adjusted under 35 U.S.C. 154(b) by 320 days.

(21) Appl. No.: 10/597,397

(22) PCT Filed: Feb. 13, 2004

(86) PCT No.: PCT/EP2004/001338

§ 371 (c)(1),
(2), (4) Date: Jul. 24, 2006

(87) PCT Pub. No.: WO2005/081033

PCT Pub. Date: Sep. 1, 2005

(65) Prior Publication Data

US 2008/0239480 A1   Oct. 2, 2008

(51) Int. Cl.
G02B 23/24   (2006.01)
(52) U.S. Cl. ........................ 359/435; 359/434
(58) Field of Classification Search .......... 359/434–435
See application file for complete search history.

(56) References Cited

U.S. PATENT DOCUMENTS

| 4,676,606 | A | 6/1987 | Takahashi |
| 4,693,568 | A | 9/1987 | Takahashi |
| 5,097,359 | A | 3/1992 | McKinley |
| 5,142,410 | A | 8/1992 | Ono et al. |
| 5,461,509 | A | * 10/1995 | Canzek ........................ 359/435 |
| 5,743,846 | A | 4/1998 | Takahashi et al. |
| 5,888,193 | A | * 3/1999 | Breidenthal et al. .......... 600/160 |
| 7,002,741 | B2 | * 2/2006 | Lei ............................ 359/435 |

FOREIGN PATENT DOCUMENTS

| DE | 19910050 | 9/2000 |
| EP | 0628843 | 12/1994 |

OTHER PUBLICATIONS

Dobson, S.J. et al.; "A new rod-lens relay system offering improved image quality"; Journal of Physics E: Scientific Instruments; IOP Publishing; Bristol, GB; vol. 22, No. 7; Jul. 1, 1989; pp. 450-454.

* cited by examiner

*Primary Examiner*—Thong Nguyen
(74) *Attorney, Agent, or Firm*—Rankin, Hill & Clark LLP

(57) ABSTRACT

A relay set (4, 4') for the optical system of a rigid endoscope, the optical system including an objective (1) at the distal end, an ocular (5) at the proximal end and between them a relay lens system consisting of several relay sets (2, 3, 4), the relay set (4, 4') consisting of two half sets (4.1, 4.2) having the same lens units (11.1, 12.1, 13.1; 11.2, 12.2 13.2) arranged symmetrically with respect to the center (10) of the set (4, 4'), each half set (4.1, 4.2) consisting of two positive power lens units (11.1, 13.1; 11.2, 13.2) at the ends and one negative power lens unit (12.1; 12.2) in the middle, is characterized in that each half set is of Triplet design.

3 Claims, 1 Drawing Sheet

ENDOSCOPE RELAY LENS

BACKGROUND OF THE INVENTION

A rigid endoscope usually has an optical system consisting of an objective, an ocular and between them a relay lens system consisting of several relay sets. Because the objective and each relay set is producing an image which is turned upside down, and because a standard endoscope should produce an upright image, usually an odd number of relay sets is used so that the image produced by the optical system is upright.

For good image quality, the optical system of an endoscope should be well corrected for the major lens aberrations. Most of the aberrations are corrected by the symmetrical design of the relay set. But it is especially difficult to correct for curvature of field aberrations.

U.S. Pat. No. 4,693,568 shows a low cost relay set of simple design having in each half set two lens units of positive power. The disadvantage of this design is that it cannot correct the curvature of field aberration.

From U.S. Pat. No. 4,676,606, a relay set of the generic type is known. In each half set it comprises a lens unit of negative power. This negative power element is responsible for correction of field of curvature. The aberration produced by the positive elements is corrected by the negative element. The advantage of this design is that the curvature of field correction provided by this relay set can be used to have the relay set well corrected for curvature of field aberration. The correction also can be made stronger so that this relay set is not only correcting its own curvature of field aberration but also the aberration of other optical elements of the optical system. It can be used together with relay sets of different types like that shown in U.S. Pat. No. 4,693,568 and can provide the overall correction of the optical system.

The disadvantage of the system of U.S. Pat. No. 4,676,606 is that the negative power element is of the well known Gauss type. This optical design is highly complex and extremely expensive and therefore not suited for mass produced endoscopes.

BRIEF SUMMARY OF THE INVENTION

The objective of the present invention is to provide relay sets with curvature of field correction at low costs.

According to the invention, each half set of the relay set is designed in the form of a Triplet. The Triplet is a well known lens design used for camera optics. Much to the surprise of experts it turns out that the Triplet design can be used on relay sets for endoscope optics. The biggest advantage of the Triplet design is that it uses very simple lenses. In Triplet design, each half set has a positive, a negative and a positive power lens unit. The well known simple Triplet design is easy to calculate and easy to manufacture so that a very economical design results.

Advantageously, the relay set is overcompensated for curvature of field aberration so that it compensates not only its own aberration but also the aberrations of one or more other relay sets being of simple design without any curvature of field correction. For example, this gives the advantage that an existing optical system being corrected for curvature of field, can be made longer by adding two relay sets, one of them being a conventional relay set without curvature of field correction and the other one being a relay set according to the invention which gives the correction for curvature of field for both additional relay sets.

Advantageously, the outer and the middle lens units are cemented together. This gives a strong design eliminating any possibility of tilting between these two lenses in case of a shock.

Advantageously, the inner lens of each half set is a cemented doublet. This gives an additional curved surface and the possibility to make both parts of the doublet from different glasses. The result is that there are more parameters to control aberrations.

DETAILED DESCRIPTION OF THE INVENTION

Figure 1:
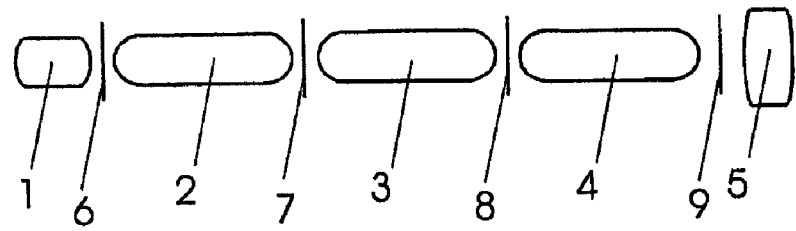
FIG. 1 the general design of the optical system of a rigid endoscope.

FIG. 1 shows the typical design of the optical system of a rigid endoscope. Within a rigid tube (not shown) the optical system is placed beginning at the distal end (in FIG. 1 to the left) with an objective 1. In the very schematic representation of FIG. 1 all lens units are shown as single lenses. In the proximal direction from the objective 1 there is following a first relay set 2, a second relay set 3 and a third relay set 4. An ocular 5 is placed at the proximal end.

The objective 1 is producing an image at an image plane 6 which is transferred by the relay set 2 to an image plane 7 and in the same way from the image plane 7 to an image plane 8 and finally to an image plane 9 on which the image is viewed by the ocular 5, instead of which, also, a camera can be placed. The objective 1 and, also, the relay sets 2, 3 and 4 turn the image upside down so that an odd number of relay sets, in the shown embodiment three relay sets, are used to have an upright image on the final image plane 9.

In the shown embodiment, the first and second relay sets 2 and 3 are of conventional design and e.g. each consist of two plane-convex rod lenses with a bi-convex shorter lens in the middle. In the standard design of an endoscopic optical system, the magnification of all relay sets is 1.

Figure 2:
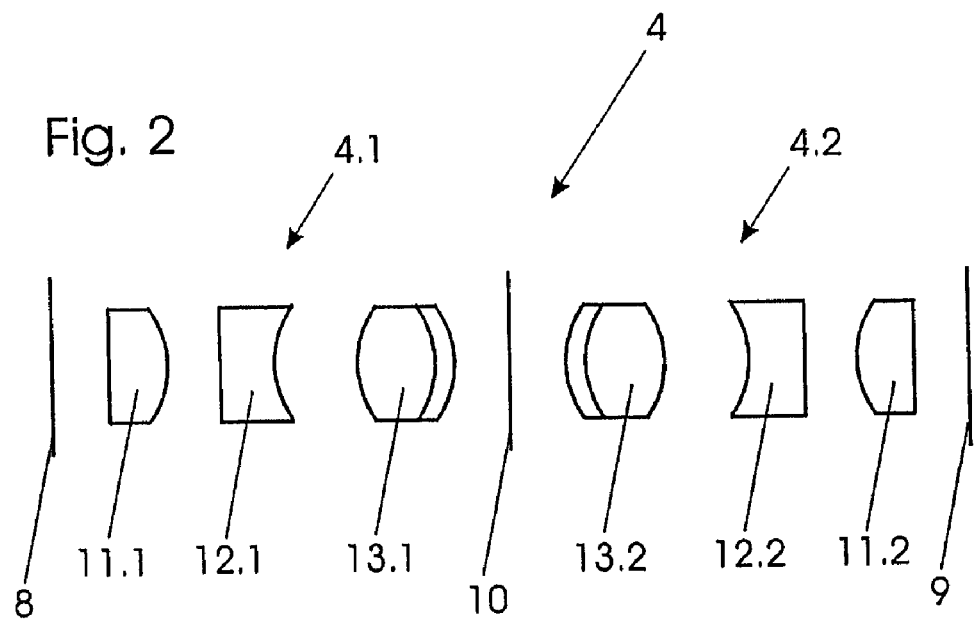
FIG. 2 a relay set according to the invention.

The third relay set 4, according to the invention, is designed as shown in a first embodiment in FIG. 2.

FIG. 2 shows the third relay set 4. The relay set consists of two half sets 4.1 and 4.2. Each of the half sets 4.1, 4.2 consists of three lens units which are identical and symmetrically placed with respect to the center 10 of the relay set.

In the half set 4.1 at the outer end (to the left) is a lens unit 11.1 of positive power. Following the lens unit 11.1 of positive power are, in the middle, a lens unit 12.1 of negative power and at the inner end a lens unit 13.1 of positive power. In the half set 4.2 the same lenses are symmetrically placed having the reference numerals 11.2, 12.2 and 13.2.

Each of the half sets 4.1 and 4.2 therefore is designed in the form of a Triplet, namely having a positive power lens unit at both ends and in the middle a negative power lens unit.

The negative power lens units 12.1 and 12.2 in the half sets 4.1 and 4.2 are providing correction to the curvature of field aberration produced by the positive power lens units. By proper selection of the negative power of the middle lens units 12.1 and 12.2, the curvature of field correction can be made just to have the lens unit 4 corrected for curvature of field aberration. In this case, if the third relay set 4 with respect to curvature of field aberration is corrected in itself, the remaining part of the optical system consisting of the elements 1, 2 and 3 also has to be corrected in itself for curvature of field aberration. The conventionally designed relay sets 2 and 3 produce aberration which can be corrected by the objective 1 which in a more complicated design has to include a negative power lens unit for this purpose.

The third relay set 4, as shown in FIG. 2, by properly choosing the negative power of the lens unit 12.1 and 12.2, can be overcorrected with respect to curvature of field aberrations so that it can be used to give correction for one or both of the relay sets 2 and 3. In this case correction from the side of the objective 1 is not necessary.

If the optical system as shown in FIG. 1 is corrected for curvature of field aberration and if a longer version is needed, two additional relay sets can be added. One of them can be of conventional design whereas the other is designed according to FIG. 2 and gives curvature of field correction for both added relay sets.

Figure 3:
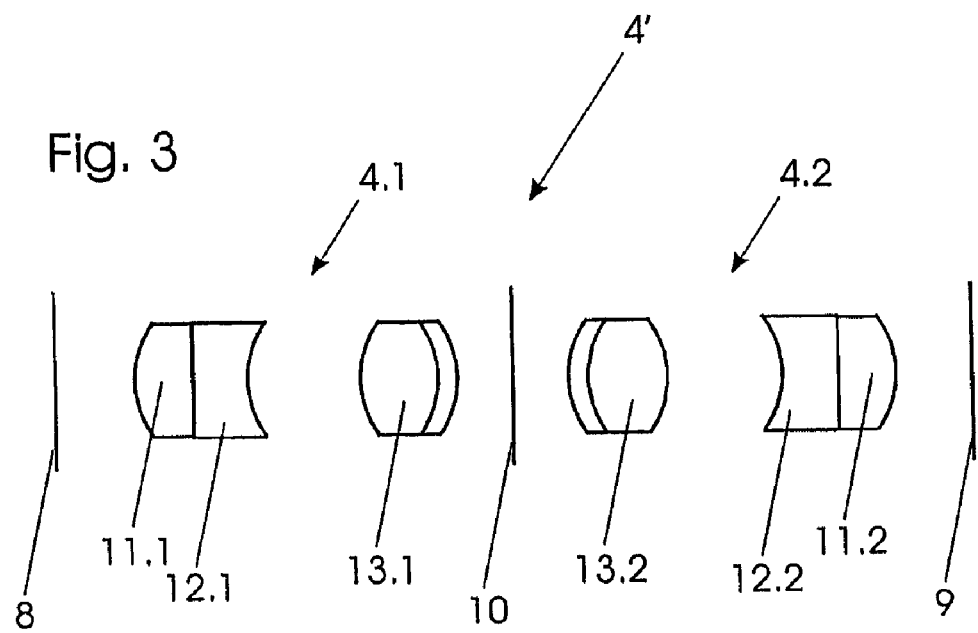
FIG. 3 an alternative design of the relay set.

FIG. 3 shows an alternative design of the relay set according to the invention. The relay set 4' shown in FIG. 3 basically is of same design as that of FIG. 2. To make comparison easier, the same reference numerals are used for the lens units.

It can be seen that the middle lens units 13.1 and 13.2 are unchanged. Also, the lens units 11.1 and 12.1 are of same design as in FIG. 2. Only the outermost lens unit 11.1 is turned around so that the lens units 11.1 and 12.1 can be placed with their flat end surfaces against each other. They are cemented together in the configuration as shown in FIG. 3. This leaves the optical properties more or less unchanged but gives a better stability especially against the tilting of these two lens units against each other.

The lens units 13.1 and 13.2 can be simple lenses of positive power. In the shown embodiments of FIG. 2 and FIG. 3, they are cemented doublets for the purpose of giving more possibilities to correct aberrations.

The invention claimed is:

1. A relay set (4') for the optical system of a rigid endoscope, said optical system comprising an objective (1) at the distal end, an ocular (5) at the proximal end and between them a relay lens system including several relay sets (2, 3, 4'), said relay set (4') consisting of:

two half sets (4.1, 4.2) having the same lens units (11.1, 12.1, 13.1; 11.2, 12.2, 13.2) arranged symmetrically with respect to the center (10) of the relay set (4'), wherein each half set (4.1, 4.2) is of a triplet design, including first and second positive power lens units (11.1, 13.1; 11.2, 13.2) at the ends and one negative power lens unit (12.1; 12.2) in the middle, wherein the first positive power lens unit is an inner end lens unit and adjacent the inner end lens unit of the neighboring half set and the second positive power lens unit is an outer end lens unit, and wherein in each half set the outer end lens unit is of planeconvex form and the middle lens unit is of plane-concave form, said outer and middle lens units (11.1, 12.1; 11.2, 12.2) being cemented together at the plane faces.

2. The relay set according to claim 1, wherein the negative power of a middle lens unit (12.1, 12.2) is of a strength to compensate curvature of field aberration also for at least one other relay set (2, 3).

3. The relay set according to claim 1, wherein the inner end lens unit (13.1, 13.2) is a cemented doublet.

* * * * *